US009898803B2

(12) United States Patent
Kajimura

(10) Patent No.: US 9,898,803 B2
(45) Date of Patent: Feb. 20, 2018

(54) IMAGE PROCESSING APPARATUS, IMAGE PROCESSING METHOD, AND RECORDING MEDIUM STORING IMAGE PROCESSING PROGRAM

(71) Applicant: OLYMPUS CORPORATION, Hachioji-shi, Tokyo (JP)

(72) Inventor: Kosuke Kajimura, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/285,007

(22) Filed: Oct. 4, 2016

(65) Prior Publication Data

US 2017/0024856 A1 Jan. 26, 2017

Related U.S. Application Data

(63) Continuation of application No. PCT/JP2015/054327, filed on Feb. 17, 2015.

(30) Foreign Application Priority Data

Apr. 16, 2014 (JP) .................................. 2014-084556

(51) Int. Cl.
*G06K 9/36* (2006.01)
*G06T 3/40* (2006.01)
(Continued)

(52) U.S. Cl.
CPC .............. *G06T 3/4053* (2013.01); *G06T 3/40* (2013.01); *G06T 7/207* (2017.01); *G06T 7/32* (2017.01);
(Continued)

(58) Field of Classification Search
CPC ..... G06T 3/40; G06T 3/4053; G06T 7/20; G06T 7/32; H04N 5/145; H04N 5/23232; H04N 5/23254
See application file for complete search history.

(56) References Cited

U.S. PATENT DOCUMENTS 8,009,933 B2    8/2011  Tanaka et al.
2009/0096879 A1*  4/2009  Motomura .............. G03B 5/00
                                                        348/208.6
(Continued)

FOREIGN PATENT DOCUMENTS

JP    2006127241 A    5/2006
JP    2011165043 A    8/2011
(Continued)

OTHER PUBLICATIONS

International Search Report (ISR) and Written Opinion dated May 12, 2015 issued in International Application No. PCT/JP2015/054327.

*Primary Examiner* — Phuoc Tran
(74) *Attorney, Agent, or Firm* — Holtz, Holtz & Volek PC

(57) ABSTRACT

An image processing apparatus including: an image obtaining unit that obtains low-resolution (LR) images acquired in time series; a position alignment unit that aligns the LR images on the basis of a movement between the LR images to generate a high-resolution (HR) image; a correlation calculating unit that calculates correlation information between areas of the LR images, the areas corresponding to partial area in the HR image; a compositing-ratio calculating unit that calculates, for each partial area, a ratio between the HR image and an image to be composited which is generated from the LR or HR images and has a lower resolution than the HR image, such that the proportion of the HR image becomes smaller as the correlation of the area decreases; and (Continued)

an image compositing unit that composites the HR image and the image to be composited according to the ratio.

9 Claims, 5 Drawing Sheets

(51) Int. Cl.
  *H04N 5/14* (2006.01)
  *H04N 5/232* (2006.01)
  *G06T 7/32* (2017.01)
  *G06T 7/207* (2017.01)
(52) U.S. Cl.
  CPC ......... *H04N 5/145* (2013.01); *H04N 5/23232* (2013.01); *H04N 5/23254* (2013.01)

(56) References Cited

U.S. PATENT DOCUMENTS

| | | |
|---|---|---|
| 2009/0129704 A1 | 5/2009 | Toda |
| 2011/0043649 A1 | 2/2011 | Nakada |
| 2012/0134579 A1* | 5/2012 | Kameyama ........... G06T 3/4053 382/159 |
| 2013/0094781 A1 | 4/2013 | Koga et al. |

FOREIGN PATENT DOCUMENTS

| | | |
|---|---|---|
| JP | 2011180670 A | 9/2011 |
| JP | 2011199786 A | 10/2011 |
| JP | 2012022653 A | 2/2012 |
| WO | 2007142109 A1 | 12/2007 |
| WO | 2011024249 A1 | 3/2011 |

\* cited by examiner

FIG. 2

| Gr | R  | Gr | R  | Gr | R  | Gr | R  |
|----|----|----|----|----|----|----|----|
| B  | Gb | B  | Gb | B  | Gb | B  | Gb |
| Gr | R  | Gr | R  | Gr | R  | Gr | R  |
| B  | Gb | B  | Gb | B  | Gb | B  | Gb |
| Gr | R  | Gr | R  | Gr | R  | Gr | R  |
| B  | Gb | B  | Gb | B  | Gb | B  | Gb |
| Gr | R  | Gr | R  | Gr | R  | Gr | R  |
| B  | Gb | B  | Gb | B  | Gb | B  | Gb |

IMAGE PROCESSING APPARATUS, IMAGE PROCESSING METHOD, AND RECORDING MEDIUM STORING IMAGE PROCESSING PROGRAM

CROSS-REFERENCE TO RELATED APPLICATIONS

This is a continuation of International Application PCT/JP2015/054327, with an international filing date of Feb. 17, 2015, which is hereby incorporated by reference herein in its entirety. This application claims the benefit of Japanese Patent Application No. 2014-084556 filed on Apr. 16, 2014, the content of which is incorporated herein by reference.

TECHNICAL FIELD

The present invention relates to an image processing apparatus, an image processing method, and an image processing program, and, in particular, to an image processing apparatus, an image processing method, and an image processing program that obtain an image whose resolution is improved by subjecting a plurality of images to compositing processing.

BACKGROUND ART

There is conventionally-known super-resolution processing for generating a higher-resolution output image from a plurality of input images. As an example of this super-resolution processing, PTL 1 discloses reconfigurable super-resolution processing in which an estimated high-resolution image is resampled by using a point spread function (PSF function), which is obtained from a camera model, to obtain low-resolution images, and a high-resolution image is repeatedly estimated such that the differences in pixel values between the low-resolution images and the original input image become small.

In the reconfigurable super-resolution processing of PTL 1, estimation of a high-resolution image is repeatedly performed, thus increasing the computational cost. On the other hand, if the number of repetitions is limited to a small number in order to reduce the computational cost, artifacts such as ghost images that would occur due to a moving object in the estimated high-resolution image cannot be reduced, thus degrading the quality of the output image.

CITATION LIST

Patent Literature

{PTL 1} Japanese Unexamined Patent Application, Publication No. 2006-127241

SUMMARY OF INVENTION

According to a first aspect, the present invention provides an image processing apparatus including: an image obtaining unit that obtains a plurality of low-resolution images acquired in time series; a movement detecting unit that detects a movement between the plurality of low-resolution images; a position alignment unit that performs position alignment of the plurality of low-resolution images on the basis of the movement and that performs pixel arrangement of the plurality of low-resolution images in an image space having a higher resolution than the low-resolution images, to generate a high-resolution image; a correlation calculating unit that calculates, for each partial area in the high-resolution image, correlation information indicating the degree of correlation between corresponding areas of the low-resolution images, the areas corresponding to this partial area; an image-to-be-composited generating unit that generates an image to be composited having a lower resolution than the high-resolution image on the basis of the plurality of low-resolution images or the high-resolution image; a compositing-ratio calculating unit that calculates, for each partial area, a compositing ratio between the high-resolution image and the image to be composited, on the basis of the correlation information; and an image compositing unit that generates a composite image of the high-resolution image and the image to be composited, according to the compositing ratio, wherein the compositing-ratio calculating unit calculates, for each partial area, the compositing ratio such that the proportion of the high-resolution image becomes smaller as the correlation of the area decreases, and the proportion of the high-resolution image becomes larger as the correlation of the area increases.

According to a second aspect, the present invention provides an image processing method including: an image obtaining step of obtaining a plurality of low-resolution images acquired in time series; a movement detecting step of detecting a movement between the plurality of low-resolution images; a position alignment step of performing position alignment of the plurality of low-resolution images on the basis of the movement and of performing pixel arrangement of the plurality of low-resolution images in an image space having a higher resolution than the low-resolution images, to generate a high-resolution image; a correlation calculating step of calculating, for each partial area in the high-resolution image, correlation information indicating the degree of correlation between corresponding areas of the low-resolution images, the areas corresponding this partial area; an image-to-be-composited generating step of generating an image to be composited having a lower resolution than the high-resolution image on the basis of the plurality of low-solution images or the high-resolution image; a compositing-ratio calculating step of calculating, for each partial area, a compositing ratio between the high-resolution image and the image to be composited, on the basis of the correlation information; and an image compositing step of generating a composite image of the high-resolution image and the image to be composited, according to the compositing ratio, wherein, in the compositing-ratio calculating step, the compositing ratio is calculated for each partial area such that the proportion of the high-resolution image becomes smaller as the correlation of the area decreases, and the proportion of the high-resolution image becomes larger as the correlation of the area increases.

According to a third aspect, the present invention provides a non-transitory computer-readable recording medium that stores an image processing program for causing a computer to execute processing, the processing including: an image obtaining step of obtaining a plurality of low-resolution images acquired in time series; a movement detecting step of detecting a movement between the plurality of low-resolution images; a position alignment step of performing position alignment of the plurality of low-resolution images on the basis of the movement and of performing pixel arrangement of the plurality of low-resolution images in an image space having a higher resolution than the low-resolution images, to generate a high-resolution image; a correlation calculating step of calculating, for each partial area in the high-resolution image, correlation information indicating the degree of correlation between corresponding areas of the low-resolution images, the areas corresponding to this partial area; an image-to-be-composited generating step of generating an image to be composited having a lower resolution than the high-resolution image on the basis of the plurality of low-resolution images or the high-resolution image; a compositing-ratio calculating step of calculating, for each partial area, a compositing ratio between the high-resolution image and the image to be composited, on the basis of the correlation information; and an image compositing step of generating a composite image of the high-resolution image and the image to be composited, according to the compositing ratio, wherein, in the compositing-ratio calculating step, the compositing ratio is calculated for each partial area such that the proportion of the high-resolution image becomes smaller as the correlation of the area decreases, and the proportion of the high-resolution image becomes larger as the correlation of the area increases.

BRIEF DESCRIPTION OF DRAWINGS

FIG. 2 is a reference diagram showing the configuration of an image acquisition element in the image processing apparatus according to the first embodiment of the present invention.

DESCRIPTION OF EMBODIMENTS

First Embodiment

An image processing apparatus according to a first embodiment of the present invention will be described below with reference to the drawings.

Figure 1:
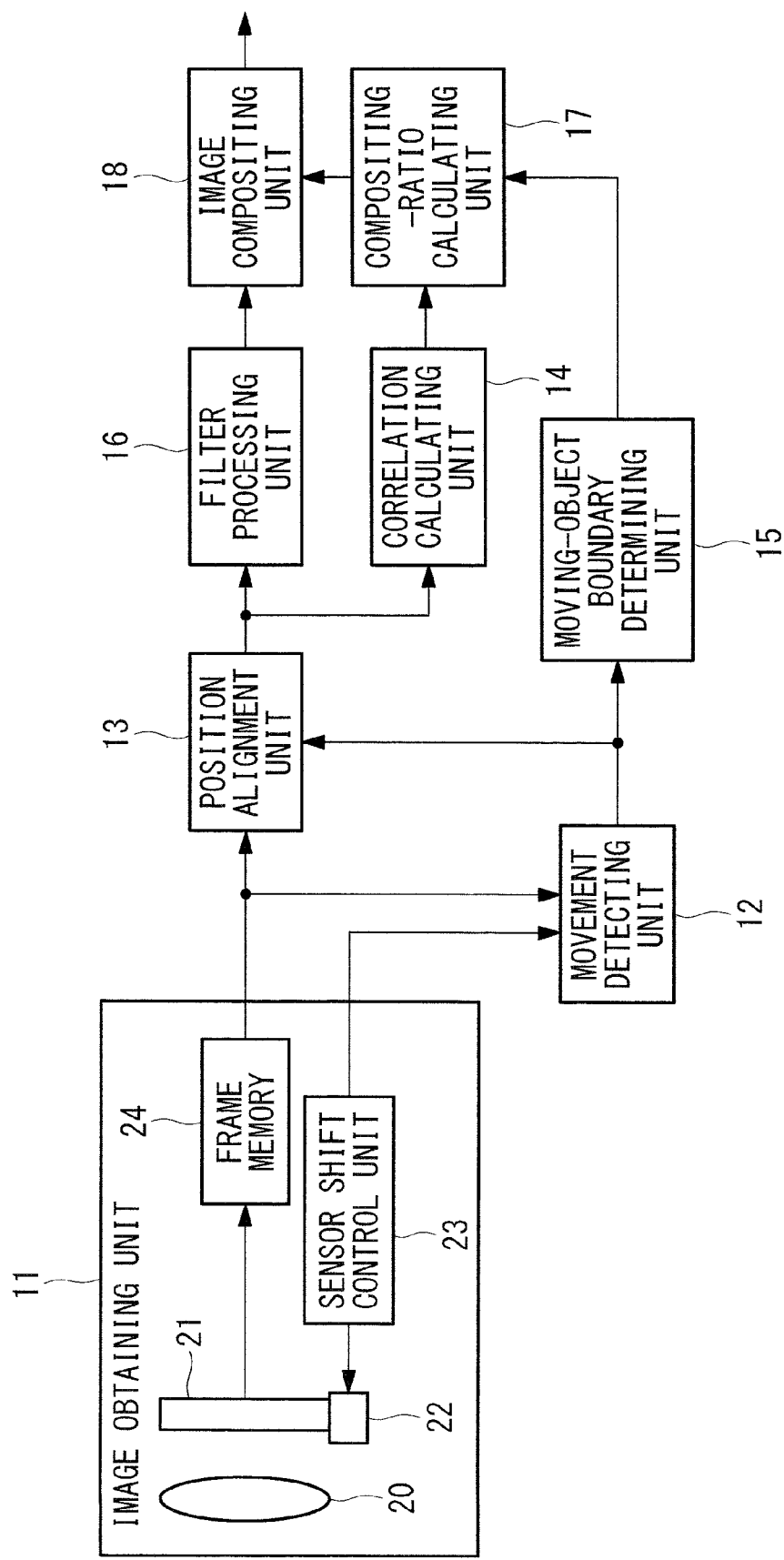
FIG. 1 is a block diagram showing, in outline, the configuration of an image processing apparatus according to a first embodiment of the present invention.

As shown in FIG. 1, the image processing apparatus is provided with an image obtaining unit 11, a movement detecting unit 12, a position alignment unit 13, a correlation calculating unit 14, a moving-object boundary determining unit 15, a filter processing unit (image-to-be-composited generating unit) 16, a compositing-ratio calculating unit 17, and an image compositing unit 18.

The image obtaining unit 11 obtains a plurality of low-resolution images that are acquired in time series. In this embodiment, it is possible to use, as the image obtaining unit 11, an image acquisition unit that is provided with: an image acquisition element 21 that obtains an optical image of a subject; a shift mechanism (moving unit) 22 that moves the image acquisition element 21; and a sensor shift control unit (movement control unit) 23 that controls the movement direction and movement distance of the image acquisition element 21 moved by the shift mechanism 22.

The image acquisition element 21 acquires an optical image of a subject focused by an imaging lens 20 and imaged in an image plane of the image acquisition element 21, thereby obtaining a low-resolution image of the optical image of the subject. In the image processing apparatus of this embodiment, so-called super-resolution processing is performed, in which low-resolution images are obtained in time series by the image acquisition element 21 and are composited to obtain a single high-resolution image. Thus, in this embodiment, the image acquisition element 21 has a Bayer-array configuration, as shown in FIG. 2.

The shift mechanism 22 moves the position of the image acquisition element 21 relative to the optical image and can relatively move the image acquisition element 21 in horizontal and vertical directions in units of subpixels. The sensor shift control unit 23 controls, in units of frames, the direction and the distance in which the image acquisition element 21 is relatively moved by the shift mechanism 22.

Specifically, the sensor shift control unit 23 outputs, to the shift mechanism 22, a control signal related to the movement direction and movement distance such that the image acquisition element 21 is moved relative to the optical image according to a predetermined condition. In the image obtaining unit 11, while the sensor shift control unit 23 controls the shift mechanism 22, the image acquisition element 21 acquires a plurality of low-resolution images having subpixel positional shifts therebetween and stores the plurality of low-resolution images in a frame memory 24. Furthermore, the sensor shift control unit 23 outputs information related to the movement direction and movement distance of the image acquisition element 21 (hereinafter, referred to as "shift information") to the movement detecting unit 12.

Note that it is not necessary to use the image acquisition unit as the image obtaining unit 11; for example, it is also possible to adopt a configuration in which a plurality of low-resolution images that have already been acquired in time series by an image acquisition device outside the image processing apparatus are obtained at one time.

The movement detecting unit 12 detects movements between the plurality of low-resolution images stored in the frame memory 24. More specifically, the movement detecting unit 12 uses, among the plurality of low-resolution images stored in the frame memory 24, one low-resolution image as a standard image and images other than the standard image as reference images and obtains movement information between the standard image and the reference images, for each predetermined partial area. For example, one block composed of 32 pixels×32 pixels is set as a partial area, and motion vectors in the horizontal direction and the vertical direction are obtained, for each partial area, through a block matching method or the like. Note that the movement information to be obtained may include not only motions in the horizontal direction and the vertical direction, but also a change in rotational direction or in scale.

The position alignment unit 13 performs position alignment of the plurality of low-resolution images on the basis of the movements detected in the movement detecting unit 12 or the shift information output from the sensor shift control unit 23 and performs pixel arrangement of the plurality of low-resolution images in an image space having a higher resolution than the low-resolution images, to generate a high-resolution image. More specifically, on the basis of the movement information for each partial area between the low-resolution images, which is obtained by the movement detecting unit 12, or the shift information, which is output by the sensor shift control unit 23, pixel arrangement of the plurality of low-resolution images stored in the frame memory 24 is performed in the high-resolution image space for each of the color channels (R, Gr, Gb, and B), to generate a high-resolution image.

As a procedure of the pixel arrangement, first, the pixels of the standard image are arranged in the high-resolution image space. Next, by using the movement information for each partial area between the standard image and a reference image to be processed and the shift information of this reference image, the position of the reference image is moved, and pixel arrangement of the reference image is performed at a predetermined position. During pixel arrangement, if a pixel having the same color as a pixel to be arranged has already been arranged by using a pixel of the standard image or a pixel of another reference image, pixel arrangement need not be additionally performed, or an average of the pixel to be arranged and an already-arranged same-color pixel may be obtained to update the pixel value.

Furthermore, after pixel arrangement of all images is performed, the position alignment unit 13 performs processing of interpolating space where pixel arrangement has not been performed yet. As the interpolation method, for example, it is possible to apply directional interpolation in which the edge direction is taken into account, by using pixels arranged nearby or to perform interpolation by copying the nearest pixel.

The correlation calculating unit 14 calculates, for each partial area in the high-resolution image, correlation information showing the degree of correlation between corresponding areas of low-resolution images, the areas corresponding to that partial area. Specifically, the correlation calculating unit 14 calculates, as the correlation information, the difference value $\Delta G=(\|Gr-Gb\|)$ between a Gr pixel and a Gb pixel at the same position in the high-resolution image, in which pixel arrangement has been performed in the high-resolution image space for each color channel by the position alignment unit 13, and outputs the difference value to the compositing-ratio calculating unit 17. It is possible to say that the degree of correlation between the corresponding areas is small when the difference value $\Delta G$ is large and that the degree of correlation between the corresponding areas is large when the difference value $\Delta G$ is small.

The moving-object boundary determining unit 15 determines whether each partial area is a boundary area of a moving object, on the basis of the movements. Specifically, the moving-object boundary determining unit 15 determines a moving-object boundary area (hereinafter, simply referred to as "boundary area") and an area that is not a moving-object boundary (hereinafter, referred to a "non-boundary area") on the basis of the movement information for each partial area, which is obtained in the movement detecting unit 12. In order to determine whether the partial area is a boundary area or not, it is possible to calculate, for example, the degree of similarity in local motion vectors between a determination-target partial area and surrounding partial areas adjacent to this partial area.

Figure 3:
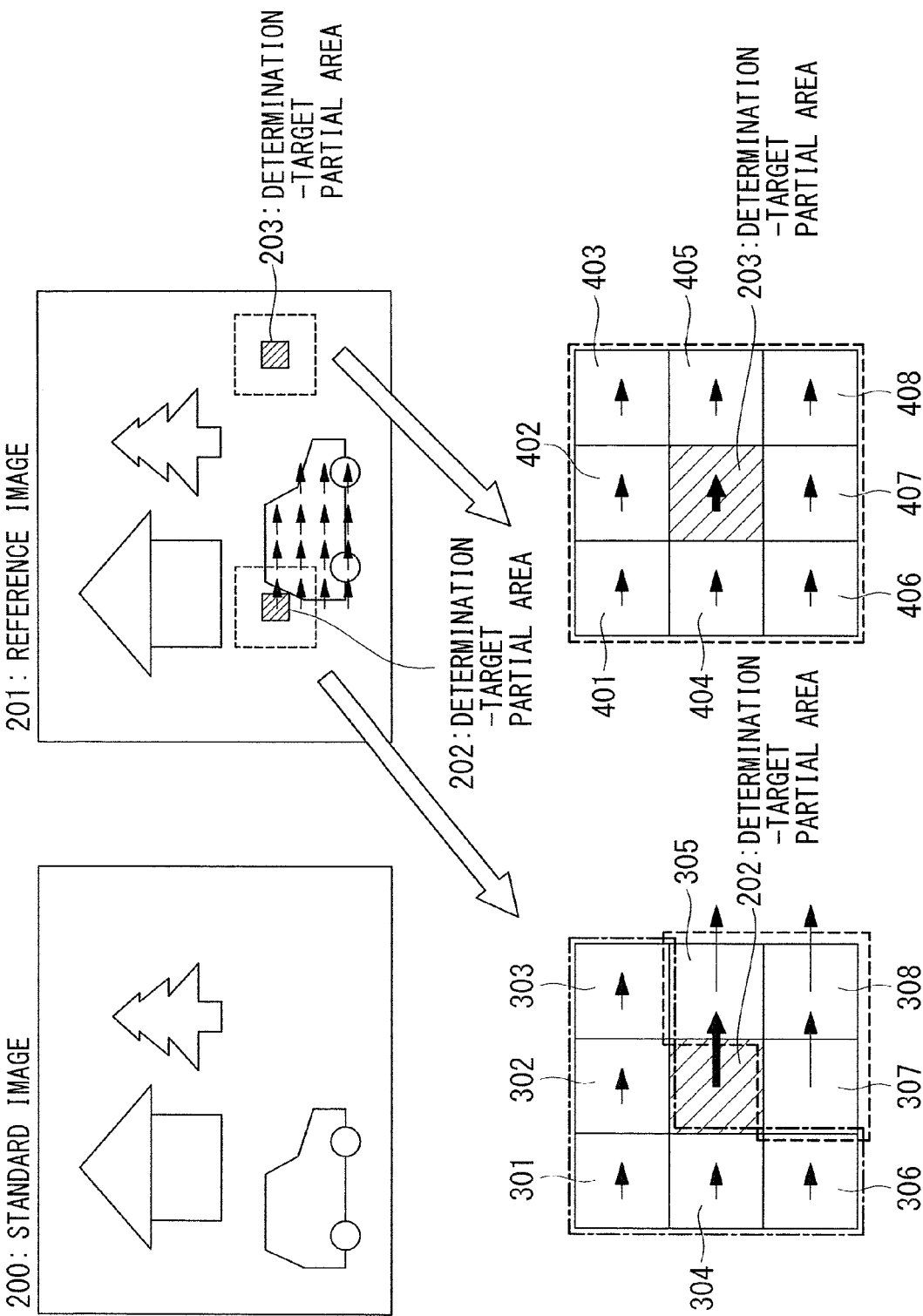
FIG. 3 is a view for explaining determination between a moving-object boundary area and a non-boundary area, in the first embodiment of the present invention.

FIG. 3 shows an example of moving-object boundary determination performed when a moving object is moved between a standard image 200 and a reference image 201. In FIG. 3, when it is determined whether or not a determination-target partial area 202 is a boundary area local motion vectors of the partial area 202 and eight partial areas 301 to 308 adjacent to the partial area 202 are calculated, and the degrees of similarity in local motion vectors between the partial area 202 and each of the adjacent partial areas 301 to 308 are calculated.

In the eight adjacent partial areas 301 to 308, there exist two area groups, i.e., an area group (partial areas 305, 307, and 308) that has a high degree of similarity in local motion vectors and an area group (partial areas 301 to 304, and 306) that has a low degree of similarity; thus, the determination-target partial area 202 is determined as a boundary area. On the other hand, in a case of determination-target partial area 203, eight adjacent partial areas 401 to 408 all have similar local motion vectors; that is, it can be determined that there exists only one area group that has a high degree of similarity, and thus, the partial area 203 is determined as a non-boundary area.

The filter processing unit 16 functions as an image-to-be-composited generating unit, and generates an image to be composited having a lower resolution than the high-resolution image on the basis of the plurality of low-resolution images or the high-resolution image. In this embodiment, the filter processing unit 16 is provided with a first low-pass filter having a strong low-pass effect and a second low-pass filter having a weak low-pass effect. In the filter processing unit 16, the high-resolution image obtained from the position alignment unit 13 is subjected to filter processing having a strong low-pass effect by using the first low-pass filter, thus generating an image to be composited, and is also subjected to filter processing having a weak low-pass effect by using the second low-pass filter, thus generating a high-resolution image for compositing.

The first low-pass filter, i.e., a filter having a strong low-pass effect, is, for example, a filter that has low-pass filter characteristics for blurring the trajectory of a moving object and attenuating high-frequency components as much as possible and is a filter that blurs the moving object as if the blurring is produced during exposure, for an area that can be assumed from the correlation information to be an area having a low degree of correlation between a plurality of low-resolution images, i.e., to be an area where position alignment of the moving object has failed.

The second low-pass filter, i.e., a filter having a weak low-pass effect, is, for example, a filter that has filter characteristics in which a minute error in position alignment is removed while leaving edges and textures in the high-resolution image as much as possible and that attenuates only Nyquist frequencies of the high-resolution image while passing or emphasizing frequency components from a low band to the Nyquist frequency band.

Note that, because the first low-pass filter has a stronger effect than the second low-pass filter, the image to be composited, which is generated by using the first low-pass filter, has a lower resolution than the high-resolution image for compositing, which is generated by using the second low-pass filter.

The compositing-ratio calculating unit 17 calculates, for each partial area, the compositing ratio between the high-resolution image and the image to be composited, on the basis of the correlation information. At this time, the compositing-ratio calculating unit 17 calculates the compositing ratio for each partial area such that the proportion of the high-resolution image becomes smaller as the correlation of the area decreases, and the proportion of the high-resolution image becomes larger as the correlation of the area increases. Furthermore, when the partial area is a boundary area, the compositing-ratio calculating unit 17 calculates the compositing ratio such that the proportion of the high-resolution image becomes smaller compared with when is a non-boundary area.

Figure 4:
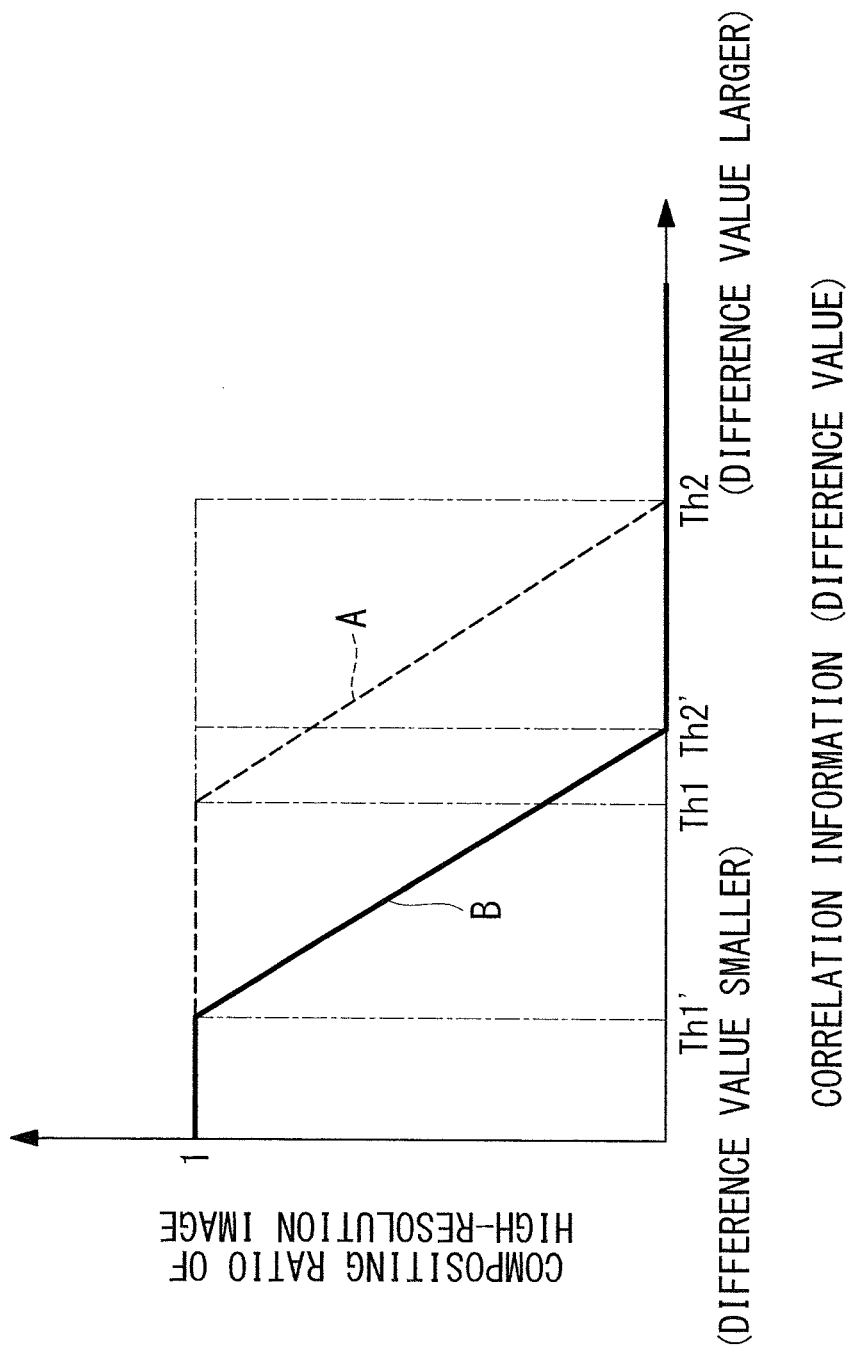
FIG. 4 is a graph showing example compositing ratios in the first embodiment of the present invention.

FIG. 4 shows example compositing ratios of the high-resolution image. In FIG. 4, the compositing ratio for a non-boundary area is indicated by A, and the compositing ratio for a boundary area is indicated by B. As shown in FIG. 4, the compositing ratio A for a non-boundary area and the compositing ratio B for a boundary area are both set such that the proportion of the high-resolution image becomes smaller for an area that has a larger difference value, i.e., an area that has a lower correlation, and the proportion of the high-resolution image becomes larger for an area that has a smaller difference value, i.e., an area that has a higher correlation.

Furthermore, the compositing ratio A for a non-boundary area is set to 1 when the difference value is lower than a threshold Th1, is linearly changed when the difference value falls within the range from the threshold Th1 to a threshold Th2, and is set to 0 when the difference value exceeds the threshold Th2. On the other hand, the compositing ratio B for a moving-object boundary area is set to 1 when the difference value is lower than a threshold Th1', is linearly changed when the difference value falls within the range from the threshold Th1' to a threshold Th2', and is set to 0 when the difference value exceeds the threshold Th2'. The threshold Th1' and the threshold Th2' have smaller values than the threshold Th1 and the threshold Th2, respectively.

In this way, when the partial area is a boundary area, the compositing ratio is calculated such that the proportion of the high-resolution image becomes smaller, compared with when the partial area is a non-boundary area. Accordingly, even if the same difference value (correlation information) shows when the partial area is a moving-object boundary area and when the partial area is a non-boundary area, the compositing ratio is calculated such that the proportion of the high-resolution image becomes smaller in a boundary area, by controlling the thresholds.

Note that, for example, as the compositing ratio, it is also possible to use the compositing ratio indicated by A in FIG. 4 as is, which varies according to the correlation information (difference value), and to correct the difference value $\Delta G$ itself, which is calculated by the correlation calculating unit 14, depending on whether the partial area is a boundary area or a non-boundary area. Specifically, when it is assumed that the difference value obtained by correcting the difference value $\Delta G$ by using an arbitrary coefficient $\alpha$ is $\Delta G'$, the difference value may be corrected by using Expression $\Delta G' = \alpha \times \Delta G$, and the compositing ratio may be calculated by using the difference value $\Delta G'$. For example, when the difference value is corrected by setting $\alpha$ to 1.5 for a boundary area and by setting $\alpha$ to 1.0 for a non-boundary area, the contribution of the difference value can be increased in a direction that makes the compositing ratio approach 0 in a boundary area.

Note that the compositing ratio of the image to be composited is calculated as follows.

The compositing ratio of the image to be composited=1− the compositing ratio of the high-resolution image The image compositing unit 18 generates a composite image of the high-resolution image for compositing and the image to be composited, according to the compositing ratio, and outputs the generated composite image.

In the thus-configured image processing apparatus of this embodiment, image processing, i.e., so-called super-resolution processing, is performed as follows.

First, the image obtaining unit 11 obtains a plurality of low-resolution images in time series and temporarily stores them in the frame memory 24. Next, the movement detecting unit 12 detects movements between the plurality of low-resolution images stored in the frame memory 24 and outputs the detected movements to the position alignment unit 13 and the moving-object boundary determining unit 15.

The position alignment unit 13 generates a high-resolution image by performing position alignment of the plurality of low-resolution images in a high-resolution image space on the basis of the movements detected in the movement detecting unit 12 or the shift information output from the sensor shift control unit 23 and outputs the generated high-resolution image to the correlation calculating unit 14 and the filter processing unit 16. In the correlation calculating unit 14, the correlation calculating unit 14 calculates, as correlation information, the difference value $\Delta G=(\|Gr-Gb\|)$ between the Gr pixel and the Gb pixel at the same position in the high-resolution image, in which pixel arrangement has been performed in the high-resolution image space for each color channel by the position alignment unit 13, and outputs the correlation information to the compositing-ratio calculating unit 17. The moving-object boundary determining unit 15 determines, on the basis of the movements, whether each partial area is a moving-object boundary area or a non-boundary area and outputs the determination result to the compositing-ratio calculating unit 17.

The filter processing unit 16 applies the first low-pass filter to the high-resolution image, thus generating an image to be composited, applies the second low-pass filter thereto, thus generating a high-resolution image for compositing, and outputs the image to be composited and the high-resolution image for compositing to the image compositing unit 18.

The compositing-ratio calculating unit 17 calculates the compositing ratio for each partial area on the basis of the correlation information and whether or not this partial area is a boundary area.

The image compositing unit 18 generates a composite image by compositing the image to be composited and the high-resolution image for compositing according to the compositing ratio calculated by the compositing-ratio calculating unit 17.

According to this embodiment, when the compositing ratio for each partial area is calculated, the compositing ratio is calculated for each partial area on the basis of the correlation information and whether or not this partial area is a boundary area. Specifically, when the difference value is large, which means that the correlation between partial areas is low, there is a high possibility that position alignment has failed, and thus, the compositing ratio of the high-resolution image, which is obtained by using the filter having a weak low-pass effect, is set smaller, and the compositing ratio of the low-resolution image to be composited, which is obtained by using the filter having a strong low-pass effect, is set larger.

Furthermore, in a boundary area, compared with in a non-boundary area, the compositing ratio of the lower-resolution image to be composited is set likely to be larger according to the correlation information. By doing so, it is possible to reliably reduce the occurrence of afterimages and artifacts, which are likely to occur in moving-object boundaries, and to improve the resolution in areas that are not moving-object boundaries, such as background areas by increasing the compositing ratio of the high-resolution image. Specifically, an image with reduced artifacts such as ghost images and with successfully improved resolution can be obtained while suppressing the computational cost Second Embodiment An image processing apparatus according to a second embodiment of the present invention will be described below with reference to the drawings. The image processing apparatus of this embodiment has a magnifying processing unit 19 instead of the filter processing unit 16 in the image processing apparatus according to the first embodiment In the image processing apparatus of this embodiment, identical reference signs are assigned to the same configurations as those of the image processing apparatus of the first embodiment, and a description thereof will be omitted.

Figure 5:
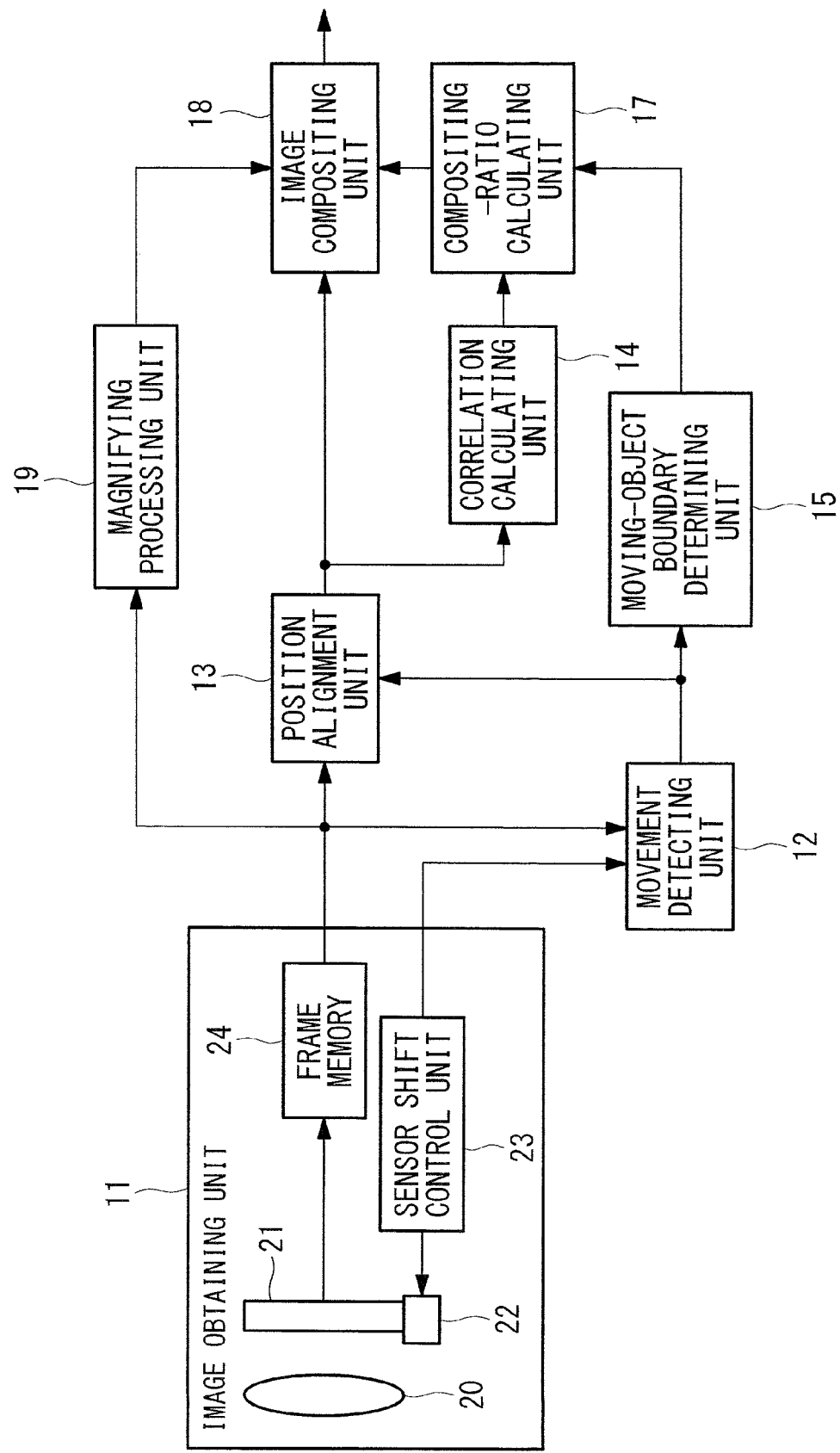
FIG. 5 is a block diagram showing, in outline, the configuration of an image processing apparatus according to a second embodiment of the present invention.

In this embodiment, as shown in FIG. 5, the magnifying processing unit 19, which serves as the image-to-be-composited generating unit, is provided, and the magnifying processing unit 19 directly receives low-resolution images from the frame memory 24.

The magnifying processing unit 19 obtains a standard image, among the plurality of low-resolution images, from the frame memory 24, magnifies the standard image so as to have the same resolution as the high-resolution image generated in the position alignment unit 13, to generate a magnified standard image as an image to be composited, and outputs the magnified standard image to the image compositing unit 18. In the image compositing unit 18, the high-resolution image, which is output from the position alignment unit 13, and the magnified standard image, which serves as the image to be composited, are composited according to the compositing ratio calculated by the compositing-ratio calculating unit 17, to generate a composite image. Calculation of the compositing ratio in the compositing-ratio calculating unit 17 is performed in the same way as in the above-described first embodiment.

Therefore, according to the image processing apparatus of this embodiment, it is also possible to reduce the occurrence of afterimages and artifacts, which are likely to occur in a moving-object boundary, and to improve the resolution in an area that is not a moving-object boundary, such as a background area, by increasing the compositing ratio of the high-resolution image, which is formed by arranging the pixels of a plurality of images.

Specifically, an image with reduced artifacts such as ghost images and with successfully improved resolution can be obtained while suppressing the computational cost.

Note that, in the above-described embodiments, a description has been given of an example case in which an image having a higher resolution than a plurality of input images obtained in the image obtaining unit is generated; however, the above-described image processing apparatus can be applied to noise reduction processing, high-dynamic-range processing, or the like for generating an image having the same resolution as input images, by compositing a plurality of images.

Furthermore, the image processing apparatus according to each of the above-described embodiments can have a configuration to be installed inside an image processing apparatus of a digital camera or the like. Furthermore, it is possible to provide a configuration in which an image processing program for performing the above-described image processing is deployed and executed by a general-purpose or special-purpose computer; specifically, the above-described image processing apparatus can be realized by a general-purpose or special-purpose computer.

Note that the image processing program for performing the above-described image processing can be stored in a computer in advance as well as in a computer-readable storage medium, such as a magnetic disk, a magneto-optic disk, a CD-ROM, a DVD-ROM, and a semiconductor memory.

From the above-described embodiments and modifications thereof, the following aspects of the invention are derived.

According to a first aspect, the present invention provides an image processing apparatus including: an image obtaining unit that obtains a plurality of low-resolution images acquired in time series; a movement detecting unit that detects a movement between the plurality of low-resolution images; a position alignment unit that performs position alignment of the plurality of low-resolution images on the basis of the movement and that performs pixel arrangement of the plurality of low-resolution images in an image space having a higher resolution than the low-resolution image generate a high-resolution image; a correlation calculating unit that calculates, for each partial area in the high-resolution image, correlation information indicating the degree of correlation between corresponding areas of the low-resolution images, the areas corresponding to this partial area; an image-to-be-composited generating unit that generates an image to be composited having a lower resolution than the high-resolution image on the basis of the plurality of low-resolution images or the high-resolution image; a compositing-ratio calculating unit that calculates, for each partial area, a compositing ratio between the high-resolution image and the image to be composited, on the basis of the correlation information; and an image compositing unit that generates a composite image of the high-resolution image and the image to be composited, according to the compositing ratio, wherein the compositing-ratio calculating unit calculates, for each partial area, the compositing ratio such that the proportion of the high-resolution image becomes smaller as the correlation of the area decreases, and the proportion of the high-resolution image becomes larger as the correlation of the area increases.

According to this aspect, a plurality of low-resolution images of the same subject that are acquired in time series are obtained, and a single improved-resolution image is obtained from the plurality of low-resolution images. In this case, in order to prevent the occurrence of artifacts in the improved-resolution image due to a movement in the low-resolution images, the position alignment unit corrects a movement between the plurality of images, which is detected by the movement detecting unit, i.e., performs position alignment, and performs pixel arrangement of the plurality of low-resolution images in a high-resolution image space, to generate a high-resolution image. The high-resolution image is divided into predetermined partial areas, and, for each of the partial areas, correlation information indicating the degree of correlation between corresponding areas of the low-resolution images, the areas corresponding to this partial area, is calculated. With the correlation information, it is possible to determine to some extent whether this partial area is an area that has a low correlation between the plurality of images, i.e., an area that contains a large movement or an area that contains a moving object. In an area that is determined to have a low correlation, there is a possibility that position alignment has failed in the high-resolution image. Thus, the image-to-be-composited generating unit generates an image to be composited having a lower resolution than the high-resolution image from the high-resolution image or the plurality of low-resolution images. Then, the compositing-ratio calculating unit calculates, for each partial area, the compositing ratio between the high-resolution image and the image to be composited, on the basis of the correlation information. At this time, the compositing ratio is calculated for each partial area such that the proportion of the high-resolution image becomes smaller as the correlation of the area decreases, and the proportion of the high-resolution image becomes larger as the correlation of the area increases. The image compositing unit generates a composite image of the high-resolution image and the image to be composited, according to the compositing ratio.

By doing so, when a composite image is generated, for a partial area based on an area that has a low correlation between the plurality of low-resolution images, for example, an area that has a large movement, e.g., that includes a moving object, the proportion of the image to be composited is increased, thereby suppressing artifacts such as ghost images. On the other hand, for a partial area based on an area that has a high correlation between the plurality of low-resolution images, for example, a static area, the proportion of the high-resolution image is increased, thereby reliably improving the resolution. Therefore, an image with reduced artifacts such as ghost images and with successfully improved resolution can be obtained while suppressing the computational cost.

In the first aspect, it is preferred that a moving-object boundary determining unit that determines whether or not the partial area is a boundary area of a moving object, on the basis of the movement, be further included, wherein, when the partial area is the boundary area, the compositing-ratio calculating unit calculates the compositing ratio such that the proportion of the high-resolution image becomes smaller than when the partial area is a non-boundary area.

By doing so, even when partial areas have the same level of correlation information, different compositing ratios can be set therefor depending on whether the partial areas are boundary areas or not. Therefore, even in the vicinity of a moving-object boundary where artifacts are likely to occur, it is possible to improve the resolution of a moire area in a static area, such as a background area, while reliably suppressing the occurrence of artifacts.

In the first aspect, the image obtaining unit may be an image acquisition unit that is provided with: an image acquisition element that acquires a plurality of frames of an optical image of a subject in time series; a moving unit that moves the position of the image acquisition element relative to the optical image; and a movement control unit that controls the movement direction and movement distance of the image acquisition element relative to the optical image, moved by the moving unit.

In the first aspect, the position alignment unit may perform position alignment on the basis of at least one of: the movement; and the movement direction and movement distance.

By doing so, a high-resolution image can be generated, in consideration of not only a movement but also the movement direction and movement distance of the image acquisition element, regarding the plurality of low-resolution images, which are acquired in time series by the image acquisition unit while shifting pixels; therefore, an inhibitory effect on artifacts is further improved while improving the resolution.

In the first aspect, it is preferred that the correlation calculating unit calculate correlation information for each partial area on the basis of a color channel of the high-resolution image.

By doing so, calculation of correlation information for the partial area is easy, and thus the computational cost can be reduced while easily obtaining the correlation information.

In the first aspect, it is preferred that the image-to-be-composited generating unit subject the high-resolution image to filter processing, to generate, as the image to be composited, an image having a lower resolution than the high-resolution image.

For example, a low-pass filter for reducing high-frequency components in the high-resolution image or another filter can be used, and an image to be composited is generated in this way, thereby making it possible to suppress artifacts in an area that is determined to have a low correlation, during compositing processing to be performed later.

In the first aspect, it is preferred that the image-to-be-composited generating unit magnify one image of the plurality of low-resolution images so as to have the same resolution as the high-resolution image, to generate a magnified image as the image to be composited.

The image to be composited is generated in this way, thereby making it possible to suppress artifacts in an area that is determined to have a low correlation, during compositing processing to be performed later.

According to a second aspect, the present invention provides an image processing method including: an image obtaining step of obtaining a plurality of low-resolution images acquired in time series; a movement detecting step of detecting a movement between the plurality of low-resolution images; a position alignment step of performing position alignment of the plurality of low-resolution images on the basis of the movement and of performing pixel arrangement of the plurality of low-resolution images in an image space having a higher resolution than the low-resolution images, to generate a high-resolution image; a correlation calculating step of calculating, for each partial area in the high-resolution image, correlation information indicating the degree of correlation between corresponding areas of the low-resolution images, the areas corresponding to this partial area; an image-to-be-composited generating step of generating an image to be composited having a lower resolution than the high-resolution image on the basis of the plurality of low-resolution images or the high-resolution image; a compositing-ratio calculating step of calculating, for each partial area, a compositing ratio between the high-resolution image and the image to be composited, on the basis of the correlation information; and an image compositing step of generating a composite image of the high-resolution image and the image to be composited, according to the compositing ratio, wherein, in the compositing-ratio calculating step, the compositing ratio is calculated for each partial area such that the proportion of the high-resolution image becomes smaller as the correlation of the area decreases, and the proportion of the high-resolution image becomes larger as the correlation of the area increases.

According to a third aspect, the present invention provides a non-transitory computer-readable recording medium that stores an image processing program for causing a computer to execute processing, the processing including: an image obtaining step of obtaining a plurality of low-resolution images acquired in time series; a movement detecting step of detecting a movement between the plurality of low-resolution images; a position alignment step of performing position alignment of the plurality of low-resolution images on the basis of the movement and of performing pixel arrangement of the plurality of low-resolution images in an image space having a higher resolution than the low-resolution images, to generate a high-resolution image; a correlation calculating step of calculating, for each partial area in the high-resolution image, correlation information indicating the degree of correlation between corresponding areas of the low-resolution images, the areas corresponding to this partial area; an image-to-be-composited generating step of generating an image to be composited having a lower resolution than the high-resolution image on the basis of the plurality of low-resolution images or the high-resolution image; a compositing-ratio, calculating step of calculating, for each partial area, a compositing ratio between the high-resolution image and the image to be composited, on the basis of the correlation information; and an image compositing step of generating a composite image of the high-resolution image and the image to be composited, according to the compositing ratio, wherein, in the compositing-ratio calculating step, the compositing ratio is calculated for each partial area such that the proportion of the high-resolution image becomes smaller as the correlation of the area decreases, and the proportion of the high-resolution image becomes larger as the correlation of the area increases.

REFERENCE SIGNS LIST 11 image obtaining unit
12 movement detecting unit
13 position alignment unit
14 correlation calculating unit
15 moving-object boundary determining unit
16 filter processing unit (image-to-be-composited generating unit)
17 compositing-ratio calculating unit
18 image compositing unit
19 magnifying processing unit
21 image acquisition element
22 shift mechanism (moving unit)
23 sensor shift control unit (movement control unit)

The invention claimed is:

1. An image processing apparatus comprising:
   an image obtaining unit that obtains a plurality of low-resolution images acquired in time series;
   a movement detecting unit that detects a movement between the plurality of low-resolution images;
   a position alignment unit that performs position alignment of the plurality of low-resolution images on the basis of the movement and that performs pixel arrangement of the plurality of low-resolution images in an image space having a higher resolution than the low-resolution images, to generate a high-resolution image;
   a correlation calculating unit that calculates, for each partial area in the high-resolution image, correlation information indicating the degree of correlation between corresponding areas of the low-resolution images, the areas corresponding to this partial area;
   an image-to-be-composited generating unit that generates an image to be composited having a lower resolution than the high-resolution image on the basis of the plurality of low-resolution images or the high-resolution image;
   a compositing-ratio calculating unit that calculates, for each partial area, a compositing ratio between the high-resolution image and the image to be composited, on the basis of the correlation information; and
   an image compositing unit that generates a composite image of the high-resolution image and the image to be composited, according to the compositing ratio,
   wherein the compositing-ratio calculating unit calculates, for each partial area, the compositing ratio such that the proportion of the high-resolution image becomes smaller as the correlation of the area decreases, and the proportion of the high-resolution image becomes larger as the correlation of the area increases.

2. The image processing apparatus according to claim 1, further comprising a moving-object boundary determining unit that determines whether or not the partial area is a boundary area of a moving object, on the basis of the movement,
   wherein, when the partial area is the boundary area, the compositing-ratio calculating unit calculates the compositing ratio such that the proportion of the high-resolution image becomes smaller than when the partial area is a non-boundary area.

3. The image processing apparatus according to wherein the image obtaining unit is an image acquisition unit that is provided with:
   an image acquisition element that acquires a plurality of frames of an optical image of a subject in time series;
   a moving unit that moves the position of the image acquisition element relative to the optical image; and
   a movement control unit that controls the movement direction and movement distance of the image acquisition element relative to the optical image, moved by the unit.

4. The image processing apparatus according to claim 3, wherein the position alignment unit performs position alignment on the basis of at least one of: the movement; and the movement direction and movement distance.

5. The image processing apparatus according to claim 1, wherein the correlation calculating unit calculates correlation information for each partial area on the basis of a color channel of the high-resolution image.

6. The image processing apparatus according to claim 1, wherein the image-to-be-composited generating unit subjects the high-resolution image to filter processing, to generate, as the image to be composited, an image having a lower resolution than the high-resolution image.

7. The image processing apparatus according to claim 1, wherein the image-to-be-composited generating unit magnifies one image of the plurality of low-resolution images so as to have the same resolution as the high-resolution image, to generate a magnified image as the image to be composited.

8. An image processing method comprising:
   an image obtaining step of obtaining a plurality of low-resolution images acquired in time series;
   a movement detecting step of detecting a movement between the plurality of low-resolution images;
   a position alignment step of performing position alignment of the plurality of low-resolution images on the basis of the movement and of performing pixel arrangement of the plurality of low-resolution images in an image space having a higher resolution than the low-resolution images, to generate a high-resolution image;
   a correlation calculating step of calculating, for each partial area in the high-resolution image, correlation information indicating the degree of correlation between corresponding areas of the low-resolution images, the areas corresponding to this partial area;
   an image-to-be-composited generating step of generating an image to be composited having a lower resolution than the high-resolution image on the basis of the plurality of low-resolution images or the high-resolution image;
   a compositing-ratio calculating step of calculating, for each partial area, a compositing ratio between the high-resolution image and the image to be composited, on the basis of the correlation information; and
   an image compositing step of generating a composite image of the high-resolution image and the image to be composited, according to the compositing ratio,
   wherein, in the compositing-ratio calculating step, the compositing ratio is calculated for each partial area such that the proportion of the high-resolution image becomes smaller as the correlation of the area decreases, and the proportion of the high-resolution image becomes larger as the correlation of the area increases.

9. A non-transitory computer-readable recording medium that stores an image processing program for causing a computer to execute processing, the processing comprising:

an image obtaining step of obtaining a plurality of low-resolution images acquired in time series;

a movement detecting step of detecting a movement between the plurality of low-resolution images;

a position alignment step of performing position alignment of the plurality of low-resolution images on the basis of the movement and of performing pixel arrangement of the plurality of low-resolution images in an image space having a higher resolution than the low-resolution images, to generate a high-resolution image;

a correlation calculating step of calculating, for each partial area in the high-resolution image, correlation information indicating the degree of correlation between corresponding areas of the low-resolution images, the areas corresponding to this partial area;

an image-to-be-composited generating step of generating an image to be composited having a lower resolution than the high-resolution image on the basis of the plurality of low-resolution images or the high-resolution image;

a compositing-ratio calculating step of calculating, for each partial area, a compositing ratio between the high-resolution image and the image to be composited, on the basis of the correlation information; and an image compositing step of generating a composite image of the high-resolution image and the image to be composited, according to the compositing ratio, wherein, in the compositing-ratio calculating step, the compositing ratio is calculated for each partial area such that the proportion of the high-resolution image becomes smaller as the correlation of the area decreases, and the proportion of the high-resolution image becomes larger as the correlation of the area increases.

* * * * *